United States Patent
Ishihara (10) Patent No.: US 11,854,187 B2
(45) Date of Patent: Dec. 26, 2023

(54) MODEL GENERATION DEVICE, ABNORMALITY DETERMINATION DEVICE, ABNORMALITY DETERMINATION SYSTEM, MODEL GENERATION METHOD, AND RECORDING MEDIUM

(71) Applicant: Mitsubishi Electric Corporation, Tokyo (JP)

(72) Inventor: Shogo Ishihara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/916,119

(22) PCT Filed: Oct. 13, 2020

(86) PCT No.: PCT/JP2020/038562
§ 371 (c)(1),
(2) Date: Sep. 30, 2022

(87) PCT Pub. No.: WO2022/079783
PCT Pub. Date: Apr. 21, 2022

(65) Prior Publication Data
US 2023/0316498 A1 Oct. 5, 2023

(51) Int. Cl.
*G06K 9/00* (2022.01)
*G06T 7/00* (2017.01)

(52) U.S. Cl.
CPC .... *G06T 7/001* (2013.01); *G06T 2207/10016* (2013.01); *G06T 2207/30108* (2013.01)

(58) Field of Classification Search
CPC ........... G06T 7/001; G06T 2207/10016; G06T 2207/30108
See application file for complete search history.

(56) References Cited

U.S. PATENT DOCUMENTS 10,579,932 B1 * 3/2020 Cantrell ............ G06F 16/24568
2006/0088187 A1 4/2006 Clarkson et al.
(Continued)

FOREIGN PATENT DOCUMENTS

| JP | 2005-250990 A | 9/2005 |
| JP | 2006-48629 A | 2/2006 |

(Continued)

OTHER PUBLICATIONS

International Search Report and Written Opinion dated Dec. 22, 2020, received for PCT Application PCT/JP2020/038562, filed on Oct. 13, 2020, 10 pages including English Translation.
(Continued)

*Primary Examiner* — Samir A Ahmed
(74) *Attorney, Agent, or Firm* — XSENSUS LLP (57) ABSTRACT

A model generation device (10) includes a specifier (103) that specifies partial moving images and a model generator (104) that generates an abnormality determination model. The partial moving images are included in a moving image acquired by imaging a production facility operable in multiple operation modes and are images for the respective operation modes. The model generator (104) generates, based on a time-series relationship between the partial moving images specified by the specifier (103) for the respective operation modes, the abnormality determination model for determination of whether an abnormality is present at the production facility based on the moving image acquired by imaging the production facility.

5 Claims, 7 Drawing Sheets

(56) References Cited

U.S. PATENT DOCUMENTS

2020/0073369 A1* 3/2020 Tatedoko ........... G05B 19/4184
2020/0082546 A1   3/2020 Cui et al.

FOREIGN PATENT DOCUMENTS

| | | |
|---|---|---|
| JP | 2009-42915 A | 2/2009 |
| JP | 2010-244724 A | 10/2010 |
| JP | 2016-66270 A | 4/2016 |
| JP | 2018-173914 A | 11/2018 |
| JP | 2020-42814 A | 3/2020 |
| WO | WO 2017126131 A1 * | 7/2017 |

OTHER PUBLICATIONS

Notice of Reasons for Refusal dated Jun. 29, 2021, received for JP Application 2021-517493, 6 pages including English Translation.
Decision of Refusal dated Oct. 12, 2021, received for JP Application 2021-517493, 6 pages including English Translation.
Decision to Grant dated Jan. 18, 2022, received for JP Application 2021-517493, 5 pages including English Translation.
Office Action dated Jun. 16, 2023, in corresponding Chinese patent Application No. 202080099486.2 with English language partial translation, 13 pages.

* cited by examiner

MODEL GENERATION DEVICE, ABNORMALITY DETERMINATION DEVICE, ABNORMALITY DETERMINATION SYSTEM, MODEL GENERATION METHOD, AND RECORDING MEDIUM

CROSS-REFERENCE TO RELATED APPLICATION

The present application is based on PCT filing PCT/JP2020/038562, filed Oct. 13, 2020, the entire contents of which are incorporated herein by reference.

DESCRIPTION

Technical Field

The present disclosure relates to a model generation device, an abnormality determination device, an abnormality determination system, a model generation method, and a program.

Background Art

Techniques have been developed for determining whether an abnormality is present in a space based on captured moving images of the space. For example, Patent Literature 1 describes a technique for constructing a learning model by learning moving images captured under normal conditions through machine learning and determining whether an abnormality is present in the space as an imaging target of the moving images based on the constructed learning model. In Patent Literature 1, the learning model is constructed by clustering and learning moving images collected from many existing installation locations with similar scenes.

Citation List

Patent Literature

Patent Literature 1: Unexamined Japanese Patent Application Publication No. 2018-173914

SUMMARY OF INVENTION

Technical Problem

The technique described in Patent Literature 1 may be used at a production site to determine whether an abnormality is present at production facilities based on captured moving images of the production facilities operating at the production site.

Production facilities may operate in multiple operation modes. For example, when a production facility is used to produce multiple types of products, the production facility operates in different operation modes for each product to be produced.

In this case, the operation modes may be switched in a predetermined order. In other words, when the production facility operates in multiple operation modes, each operation mode may have a time-series relationship with one another.

In contrast, with the technique described in Patent Literature 1, the learning model is constructed by clustering and learning the collected moving images with similar scenes. Thus, the time-series relationship described above cannot be reflected in the learning model. Thus, when an abnormality is present, or for example, when the switching order of operation modes is different from the predetermined order, the technique described in Patent Literature 1 cannot determine such an abnormality.

In response to the above issue, an objective of the present disclosure is to appropriately determine an abnormality at a production facility operable in multiple operation modes.

Solution to Problem

To achieve the above objective, a model generation device according to an aspect of the present disclosure includes specifying means for specifying partial moving images and model generation means for generating an abnormality determination model. The partial moving images are included in a moving image acquired by imaging a production facility operable in operation modes and are images for the respective operation modes. The model generation means generates, based on a time-series relationship between the partial moving images specified by the specifying means for the respective operation modes, the abnormality determination model for determination of whether an abnormality is present at the production facility based on the moving image acquired by imaging the production facility.

Advantageous Effects of Invention

The structure according to the above aspect of the present disclosure can appropriately determine an abnormality at the production facility operable in multiple operation modes.

DESCRIPTION OF EMBODIMENTS

An abnormality determination system according to one or more embodiments of the present disclosure is described with reference to the drawings. In the figures, the same or equivalent components are given the same reference signs.

Embodiment

Figure 1:
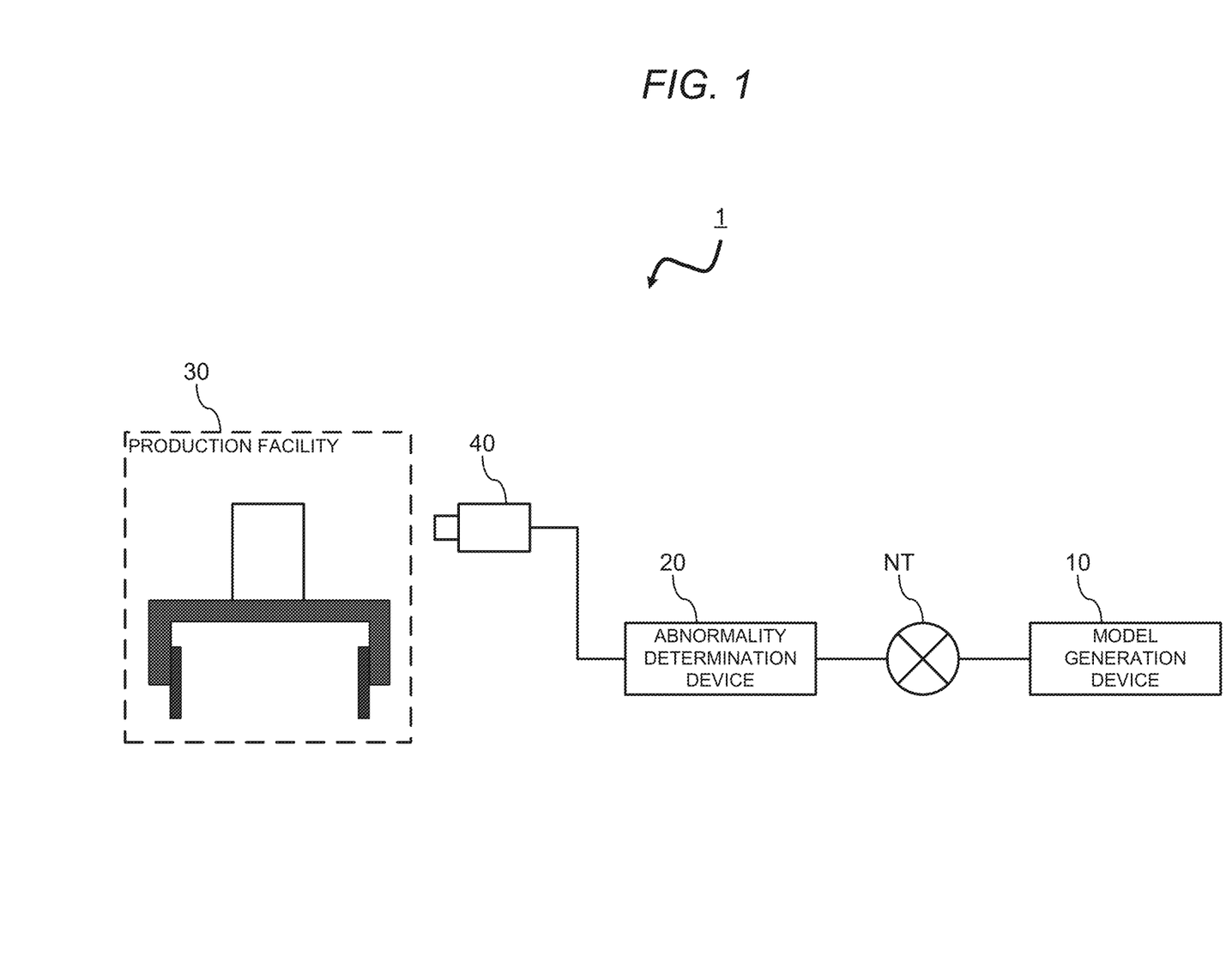
FIG. 1 is a diagram of an abnormality determination system according to an embodiment of the present disclosure illustrating an overall configuration.

An abnormality determination system 1 according to an embodiment is described with reference to FIG. 1. The abnormality determination system 1 can determine whether an abnormality is present at a production facility 30 based on moving images acquired by imaging the production facility 30 installed at the production site with an imaging device 40. The abnormality determination system 1 includes a model generation device 10, an abnormality determination device 20, the production facility 30, and the imaging device 40. The abnormality determination device 20 is connected to the imaging device 40 to allow communication. The abnormality determination device 20 and the model generation device 10 are connected to each other through a network NT to allow communication between them. The abnormality determination system 1 is an example of an abnormality determination system according to an aspect of the present disclosure.

The production facility 30 is installed at a production site at a factory to produce products. The production facility 30 includes equipment to be used for the production of products, such as belt conveyors, sensors, or industrial robots. The production facility 30 operates in multiple operation modes. For example, the production facility 30 can produce multiple types of products and operate in a different operation mode for each type. The production facility 30 is an example of a production facility in an aspect of the present disclosure.

The imaging device 40 images the production facility 30 to acquire moving images. The imaging device 40 is, for example, a digital video camera that can capture moving images. The imaging device 40 captures a moving image of the production facility 30 and transmits the moving image to the abnormality determination device 20. As described below, the moving images transmitted to the abnormality determination device 20 are used in the generation of the abnormality determination model by the model generation device 10 and for the abnormality determination by the abnormality determination device 20. The imaging device 40 is an example of imaging means in an aspect of the present disclosure.

The abnormality determination device 20 acquires the moving image acquired by imaging the production facility 30 with the imaging device 40 from the imaging device 40 and determines whether an abnormality is present at the production facility 30 based on the acquired moving images and the abnormality determination model described below. The abnormality determination device 20 acquires the abnormality determination model from the model generation device 10. The abnormality determination device 20 transmits the acquired moving images to the model generation device 10 for model generation (described below) performed by the model generation device 10. The abnormality determination device 20 includes, for example, a programmable logic controller. The functional configuration of the abnormality determination device 20 is described later. The abnormality determination device 20 is an example of the abnormality determination device according to an aspect of the present disclosure.

The model generation device 10 acquires moving images by imaging the production facility 30 with the imaging device 40 through the abnormality determination device 20 and generates an abnormality determination model based on the acquired moving images. The abnormality determination model is used by the abnormality determination device 20 to determine whether an abnormality is present at the production facility 30 based on a moving image acquired by imaging the production facility 30. The model generation device 10 performs, for example, machine learning on multiple moving images acquired by imaging production facility 30 to generate an abnormality determination model. The model generation device 10 transmits the generated abnormality determination model to the abnormality determination device 20. The model generation device 10 is, for example, a computer such as an industrial computer or a cloud server. The functional configuration of the model generation device 10 is described later. The model generation device 10 is an example of the model generation device according to an aspect of the present disclosure.

The network NT connects the model generation device 10 and the abnormality determination device 20 to allow communication. The network NT is, for example, the Internet. In some embodiments, the network NT may be a local network, such as a factory network or an office network.

Figure 2:
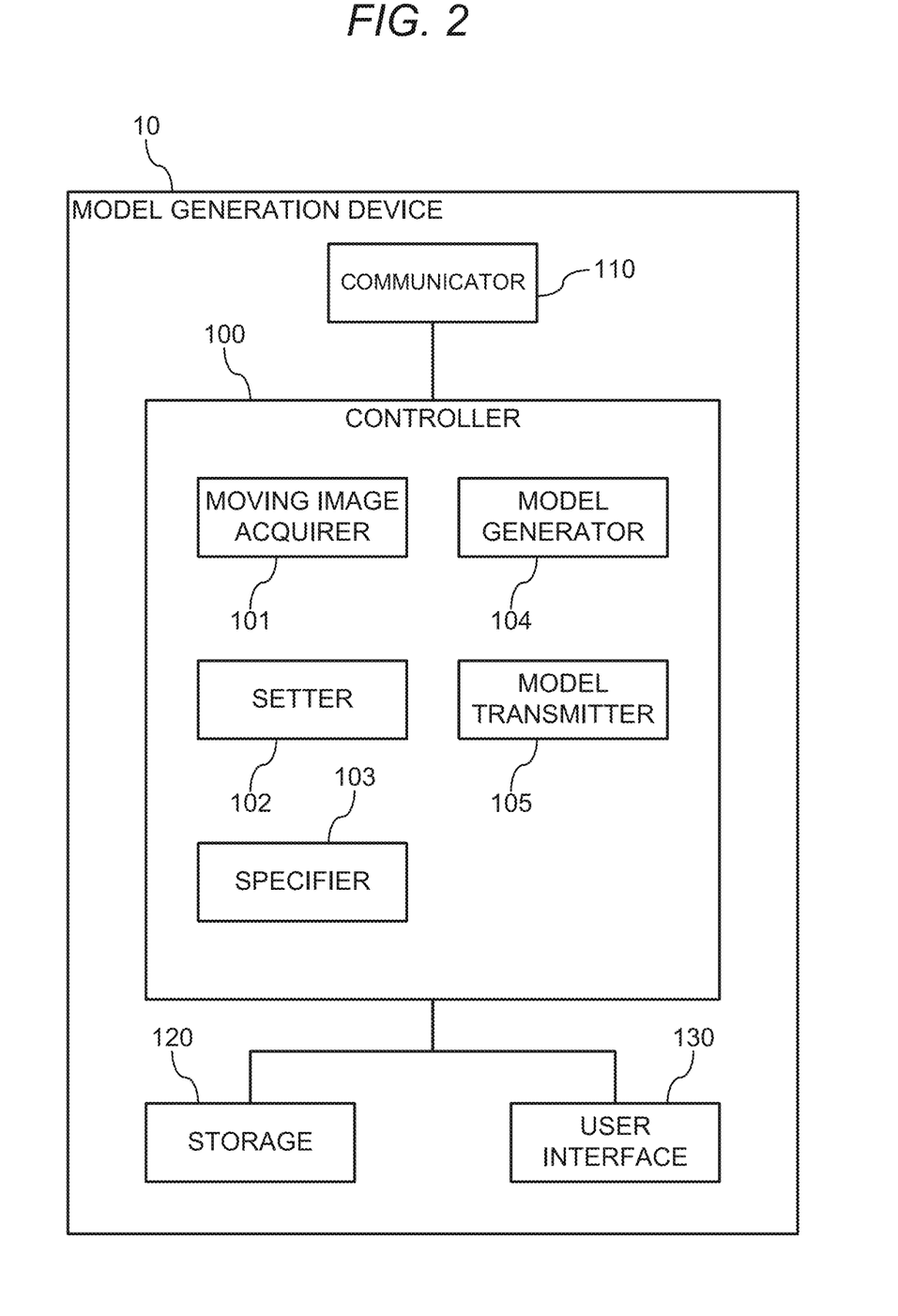
FIG. 2 is a block diagram illustrating a functional configuration of a model generation device according to an embodiment of the present disclosure.

The functional configuration of the model generation device 10 is described with reference to FIG. 2. The model generation device 10 includes a controller 100, a communicator 110, a storage 120, and a user interface 130.

The controller 100 centrally controls the model generation device 10. In particular, the controller 100 includes a moving image acquirer 101, a setter 102, a specifier 103, a model generator 104, and a model transmitter 105. The details of these functional components are described later.

The communicator 110 communicates with the abnormality determination device 20 through the network NT. The communicator 110 particularly receives moving images acquired by imaging the production facility 30 from the abnormality determination device 20 and transmits the abnormality determination model to the abnormality determination device 20.

The storage 120 stores various items of information necessary for model generation described later. The storage 120 particularly stores moving images acquired by imaging the production facility 30 and then received from the abnormality determination device 20 and information about the settings (described later) that are set by a user.

The user interface 130 receives an input from the user and informs the user of information to be used. The user interface 130 displays information on model generation settings (described later) and receives an input from the user for the settings. The user interface 130 is, for example, a touch screen. In some embodiments, the user interface 130 may be an interface for connecting external input and output devices.

The functional components of the controller 100 are described below. The moving image acquirer 101 acquires moving images by imaging the production facility 30 from the abnormality determination device 20 through the communicator 110 and stores the acquired moving images into the storage 120. The acquired and stored moving images are used by the specifier 103 and the model generator 104 described later.

The setter 102 controls the user interface 130 to inform the user of prompting for an input for model generation settings. The setter 102 acquires information, from the user interface 130, about the settings input by the user upon receiving the prompt. The setter 102 performs setting used in the model generation based on the information about the settings input by the user and stores the information about the settings into the storage 120. The settings used in the model generation include, for example, selection of moving images to be used in the model generation and the setting of threshold values for similarity determination described later. However, these settings may be eliminated. For example, for the selection of moving images, moving images within the latest 48 hours may be automatically selected. In addition, for example, a value that is empirically appropriate may also be used as the threshold value.

The specifier 103 specifies a partial moving image for each operation mode. The partial moving image is included in the moving images stored in the storage 120. For example, when the production facility 30 operates in two modes, a mode 1 and a mode 2, the moving images each include a partial moving image of the production facility 30 operating in the mode 1 and a partial moving image of the production facility 30 operating in the mode 2. The specifier 103 specifies these partial moving images included in the moving images for each operation mode. The partial moving images specified by the specifier 103 are used to generate the abnormality determination model used by the model generator 104 described later. The specifier 103 is an example of specifying means in an aspect of the present disclosure.

The specifier 103 analyzes, for example, a moving image in time-series to specify each partial moving image for the corresponding operation mode. The production facility 30 periodically repeats the same operation to continuously produce products. In each operation mode, the production facility 30 thus usually operates periodically. In other words, the point in time at which the periodic operation changes is the point in time at which the operation mode switches. The moving image in time-series is analyzed and the point in time at which the operation mode switches is specified to specify each partial moving image for the corresponding operation mode in the moving image.

Figure 3:
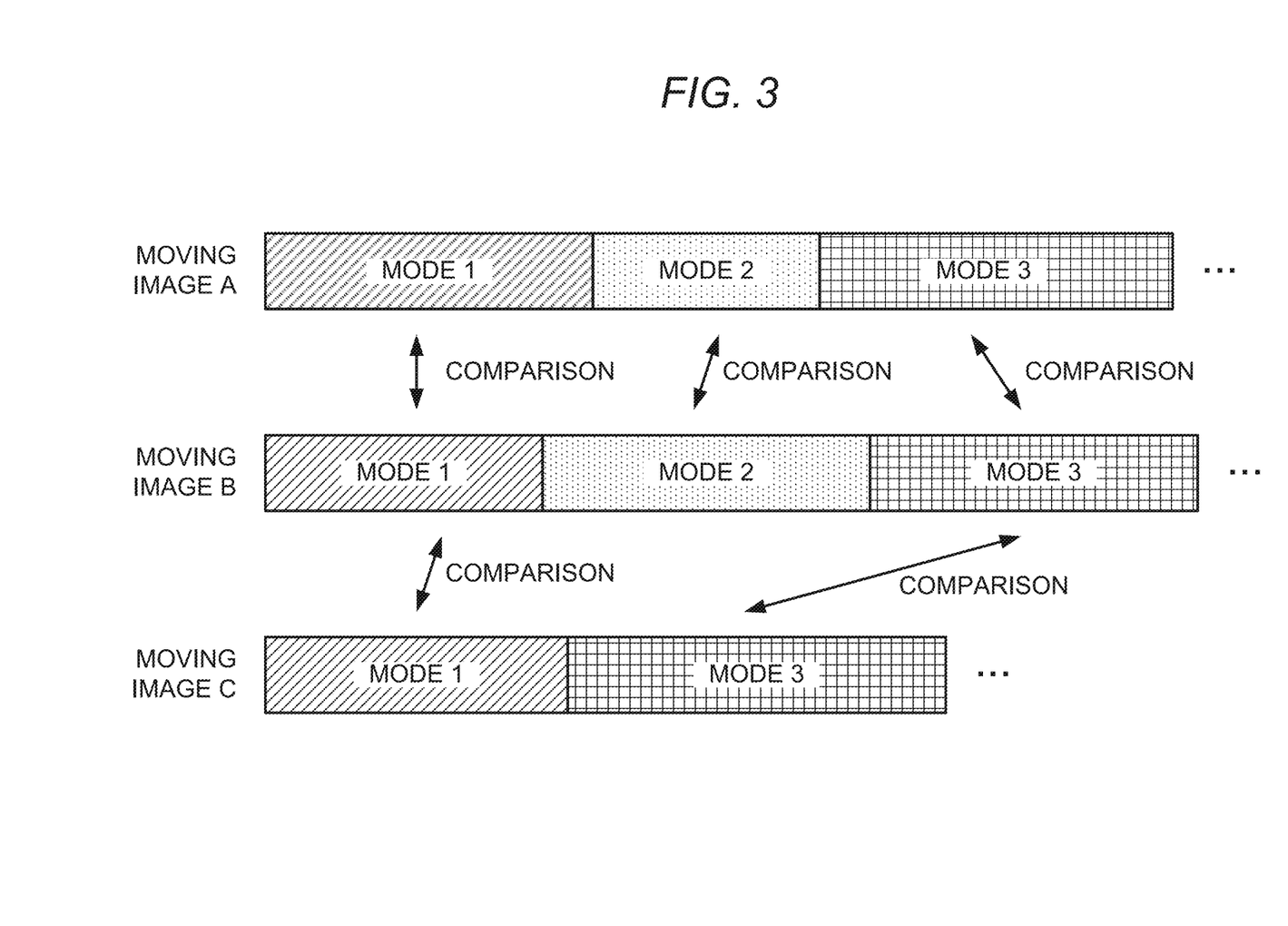
FIG. 3 is a diagram illustrating example specification of partial moving images performed by a specifier included in the model generation device according to an embodiment of the present disclosure.

When multiple moving images are to be specified, each partial moving image for the corresponding operation mode can be specified with greater accuracy, as described below. The example is described with reference to FIG. 3. FIG. 3 is a diagram illustrating example specification of a partial moving image for the mode 1, a partial moving image for the mode 2, and a partial moving image for a mode 3 performed by the specifier 103 in each of a moving image A, a moving image B, and a moving image C. However, as illustrated in FIG. 3, the moving image C does not include the partial moving image for the mode 2.

The specifier 103 compares the moving image A, the moving image B, and the moving image C in frames. When the partial moving images for the same operation mode are compared in a frame, the degree of similarity is to be greater, and when the partial moving images for different operation modes are compared in a frame, the degree of similarity is to be smaller. Thus, the point in time at which the operation mode switches can be specified more accurately compared with when one moving image is analyzed in time-series.

For example, the operation of the production facility 30 is similar between the mode 1 and the mode 2. In this case, when one moving image is analyzed in time-series to specify the partial moving image, these two operation modes may be specified as one operation mode. In contrast, with the method of comparing multiple moving images in a frame, the degree of similarity between moving images for each frame decreases when the operation mode in one moving image switches. Each partial moving image is thus specified with high accuracy. For example, in FIG. 3, the moving image B switches from the mode 1 to another operation mode earliest. When the operation mode switches from the mode 1 to the mode 2 in the moving image B, the operation modes in the moving image A and the moving image C still remain the mode 1. Thus, the degree of similarity in a frame at this point of time is smaller than the degree of similarity in a frame when all the moving images are for the same operation modes.

In FIG. 3, the moving image A and the moving image B include the partial moving images for the mode 2, but the moving image C does not include the partial moving image for the mode 2. When the moving image C is included for comparison, the partial moving image for the mode 1 and the partial moving image for the mode 2 can be specified more accurately compared with when the moving image C is not included for comparison.

Referring back to FIG. 2, the model generator 104 generates the abnormality determination model for determination of whether an abnormality is present at the production facility 30 based on the moving image acquired by imaging the production facility 30. The determination is performed based on the partial moving image for each operation mode specified by the specifier 103. The model generator 104 then stores the abnormality determination model into the storage 120. The abnormality determination model is used by the abnormality determination device 20. In particular, the model generator 104 generates the abnormality determination model based on a time-series relationship between partial moving images for each operation mode. The time-series relationship is described later. When the specifier 103 specifies the partial moving images for the multiple moving images, the model generator 104 generates the abnormality determination model based on each partial moving image for the multiple moving images. The model generator 104 generates the abnormality determination model through, for example, machine learning using each partial moving image as a learning target. The model generator 104 is an example of model generation means in an aspect of the present disclosure.

The time-series relationship is described below. For example, in the example illustrated in FIG. 3, the mode 1 is followed by the mode 2 or the mode 3, and the mode 2 is followed by the mode 3. The mode 2 is not followed by the mode 1. The partial moving images thus have the time-series relationship between them. The abnormality determination model is generated based on the moving image A, the moving image B, and the moving image C illustrated in FIG. 3. In this case, when the moving image to undergo the abnormality determination performed by the abnormality determination device 20 is acquired by imaging the production facility 30 that switches the operation mode in the order of the mode 2, the mode 1, and the mode 3, the abnormality determination device 20 determines that an abnormality is present at the production facility 30.

Referring back to FIG. 2, the model transmitter 105 transmits the abnormality determination model generated by the model generator 104 and stored in the storage 120 to the abnormality determination device 20 through the communicator 110.

Figure 4:
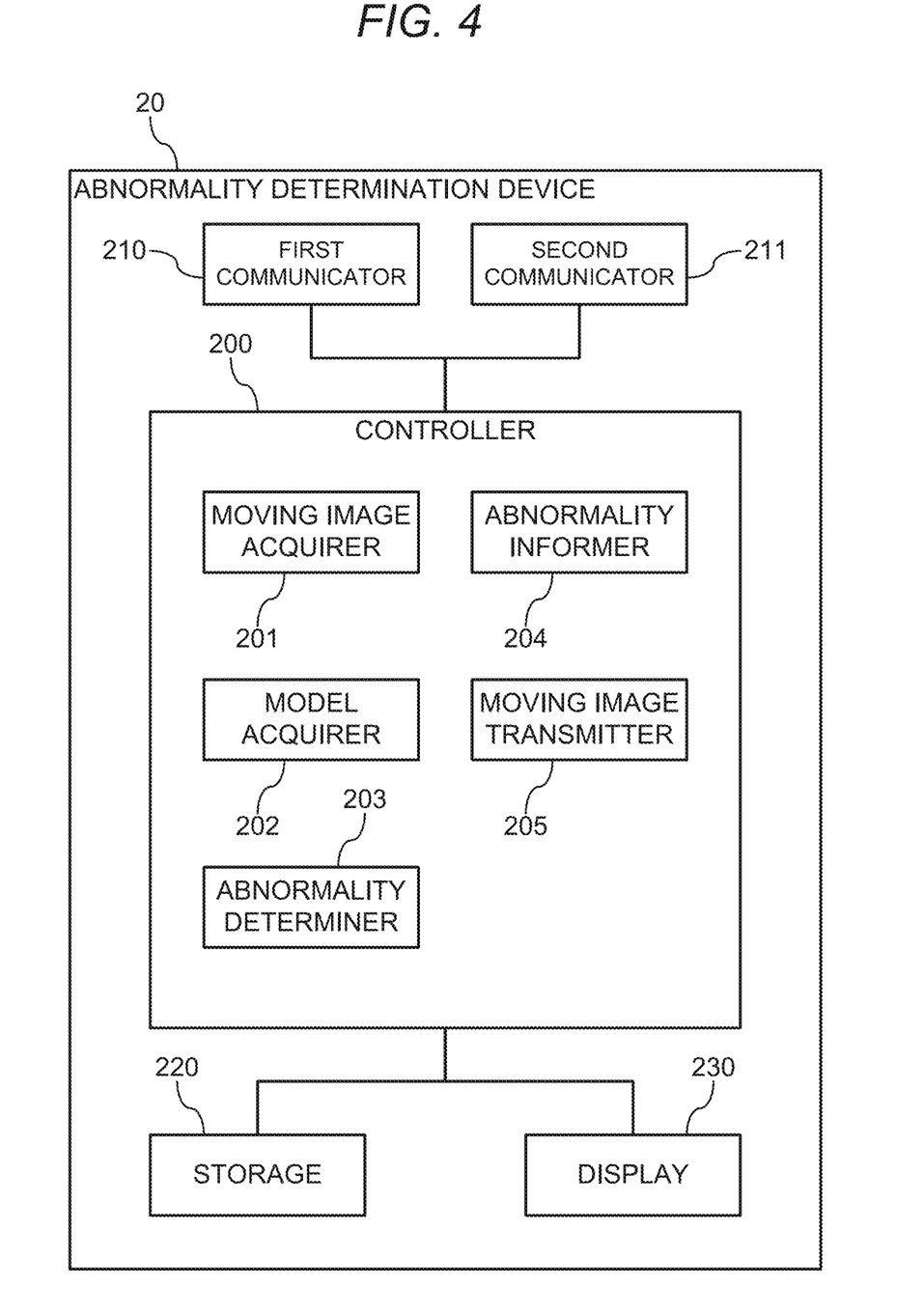
FIG. 4 is a block diagram illustrating a functional configuration of an abnormality determination device according to an embodiment of the present disclosure.

The functional configuration of the abnormality determination device 20 is described with reference to FIG. 4. The abnormality determination device 20 includes a controller 200, a first communicator 210, a second communicator 211, a storage 220, and a display 230.

The controller 200 centrally controls the abnormality determination device 20. In particular, the controller 200 includes a moving image acquirer 201, a model acquirer 202, an abnormality determiner 203, an abnormality informer 204, and a moving image transmitter 205. The details of these functional components are described later.

The first communicator 210 communicates with the imaging device 40. The first communicator 210 particularly receives the moving images of the production facility 30 captured with the imaging device 40 from the imaging device 40. The first communicator 210 is, for example, a network unit in a programmable logic controller.

The second communicator 211 communicates with the model generation device 10 through the network NT. The second communicator 211 particularly receives the abnormality determination model from the model generation device 10 and transmits the moving images of the production facility 30 captured with the imaging device 40 to the model generation device 10. The second communicator 211 is, for example, a network unit in a programmable logic controller.

The storage 220 stores the moving images of the production facility 30 captured with the imaging device 40, the abnormality determination model generated by the model generation device 10, and information indicating the result of abnormality determination performed by the abnormality determiner 203 described later. The storage 220 is an example of storage means in an aspect of the present disclosure.

When an abnormality is present at the production facility 30, the display 230 displays information indicating that an abnormality is present at the production facility 30 through control by the abnormality informer 204 described later. The display 230 thus informs the user of an abnormality present at the production facility 30. The display 230 is, for example, a liquid crystal display connected to a network unit in a programmable logic controller.

The functional components of the controller 200 are described below. The moving image acquirer 201 acquires moving images of the production facility 30 captured with the imaging device 40 from the imaging device 40 through the first communicator 210 and stores the moving images into the storage 220. The moving image acquirer 201 is an example of moving image acquisition means in an aspect of the present disclosure.

The model acquirer 202 acquires the abnormality determination model from the model generation device 10 through the second communicator 211 and stores the abnormality determination model into the storage 220.

The abnormality determiner 203 determines whether an abnormality is present at the production facility 30 based on the moving images stored in the storage 220 and the abnormality determination model stored in the storage 220. As described above, the abnormality determination model is specifically generated based on the time-series relationship between the partial moving images for each operation mode. This allows the abnormality determiner 203 to determine whether a time-series abnormality is present in multiple operation modes. For example, when an abnormality is present in the order of switching of the operation modes of the production facility 30, the abnormality determiner 203 can determine that the abnormality is present. The abnormality determiner 203 is an example of abnormality determination means in an aspect of the present disclosure.

More specifically, the abnormality determiner 203 determines whether an abnormality is present at the production facility 30 in the manner described below, for example. First, the abnormality determiner 203 extracts multiple movements of feature points in the moving image stored in the storage 220 and quantifies the movements of the production facility 30 in the moving image. The abnormality determiner 203 then scores the degree to which the quantified movements of the production facility 30 match the transition of the operation mode indicated by the abnormality determination model. The abnormality determiner 203 then determines whether an abnormality is present at the production facility 30 based on the score.

When the abnormality determiner 203 determines that an abnormality is present at the production facility 30, the abnormality informer 204 controls the display 230 to inform that an abnormality is present at the production facility 30 and stores information indicating the result of the abnormality determination performed by the abnormality determiner 203 into the storage 220. The information indicating the result of the abnormality determination stored in the storage 220 is analyzed, for example, by the manager of the production facility 30 and used for future measures to prevent abnormalities.

The moving image transmitter 205 transmits the moving images stored in the storage 220 to the model generation device 10 through the second communicator 211. The moving image transmitter 205 transmits the moving images to the model generation device 10 and allows the model generation device 10 to acquire the moving images used to generate the abnormality determination model.

Figure 5:
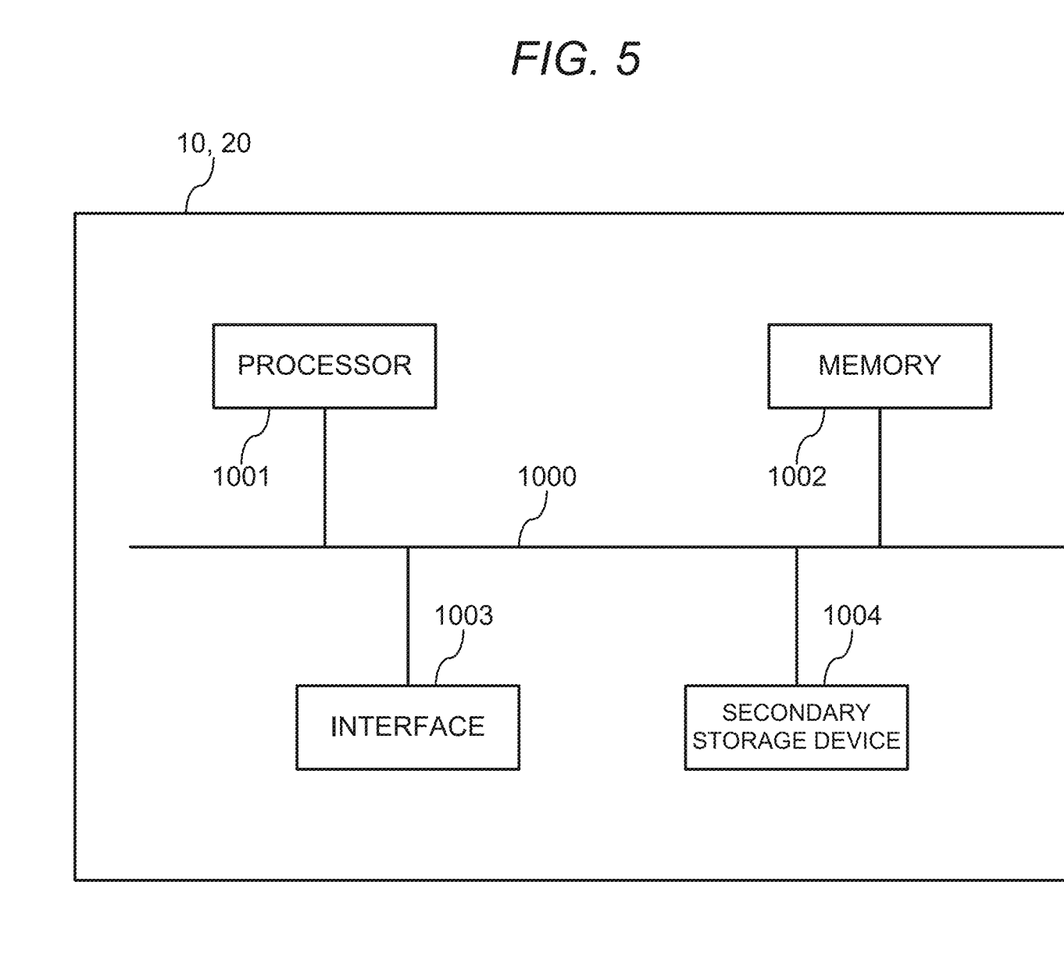
FIG. 5 is a diagram of the model generation device and the abnormality determination device according to the embodiment of the present disclosure, illustrating an example hardware configuration.

An example hardware configuration of the model generation device 10 and the abnormality determination device 20 is described with reference to FIG. 5. The model generation device 10 illustrated in FIG. 5 is implemented by a computer, such as an industrial computer or a cloud server, as described above, and the abnormality determination device 20 is implemented by, for example, a programmable logic controller.

The model generation device 10 and the abnormality determination device 20 include a processor 1001, a memory 1002, an interface 1003, and a secondary storage device 1004 that are connected to each other with a bus 1000.

The processor 1001 is, for example, a central processing unit (CPU). Each function of the model generation device 10 and the abnormality determination device 20 is implemented by the processor 1001 that reads the operating program stored in the secondary storage device 1004 into the memory 1002 and executes the operating program.

The memory 1002 is a main memory device including, for example, a random-access memory (RAM). The memory 1002 stores the operating program read by the processor 1001 from the secondary storage device 1004. The memory 1002 serves as a working memory when the processor 1001 executes the operating program.

The interface 1003 is an input-output (I/O) interface, such as a serial port, a universal serial bus port (USB), or a network interface. The interface 1003 implements the functions of the communicator 110, the first communicator 210, and the second communicator 211.

The secondary storage device 1004 is, for example, a flash memory, a hard disk drive (HDD), or a solid state drive (SSD). The secondary storage device 1004 stores the operating program to be executed by the processor 1001. The secondary storage device 1004 implements the functions of the storage 120 and the storage 220.

Figure 6:
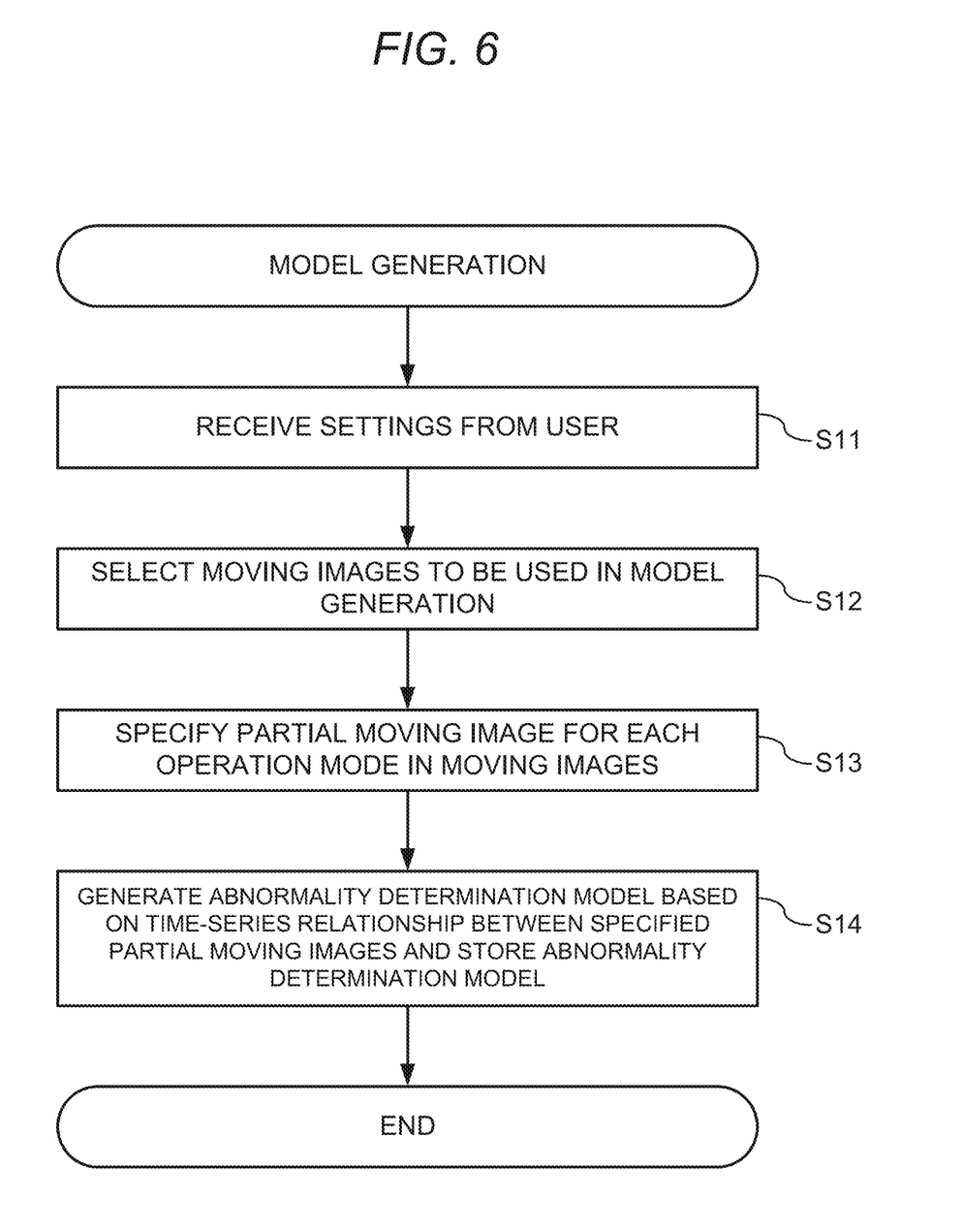
FIG. 6 is a flowchart of a model generation operation performed by the model generation device according to the embodiment of the present disclosure.

With reference to FIG. 6, a model generation operation performed by the model generation device 10 is described. In this example, the moving image acquired by imaging the production facility 30 is received from the abnormality determination device 20 and is stored in the storage 120 before the operation illustrated in FIG. 6 is started. The operation illustrated in FIG. 6 is started, for example, when the user operates the user interface 130 and provides an instruction to the model generation device 10 to generate a model.

The setter 102 in the controller 100 in the model generation device 10 receives settings from the user through operations on the user interface 130 (step S11).

The setter 102 stores information about the received settings into the storage 120. For example, the user selects one or more moving images stored in the storage 120 to set the moving image to be used in the model generation. The user sets the moving image of the production facility 30 in the normal operation as the moving image to be used in the model generation.

The controller 100 selects the moving images to be used in the model generation based on the settings received in step S11 (step S12).

The specifier 103 in the controller 100 specifies the partial moving image for each operation mode in the moving images selected in step S12 (step S13).

The model generator 104 in the controller 100 generates the abnormality determination model based on the time-series relationship between the partial moving images specified in step S13 and stores the abnormality determination model into the storage 120 (step S14).

The controller 100 then ends the model generation operation.

Figure 7:
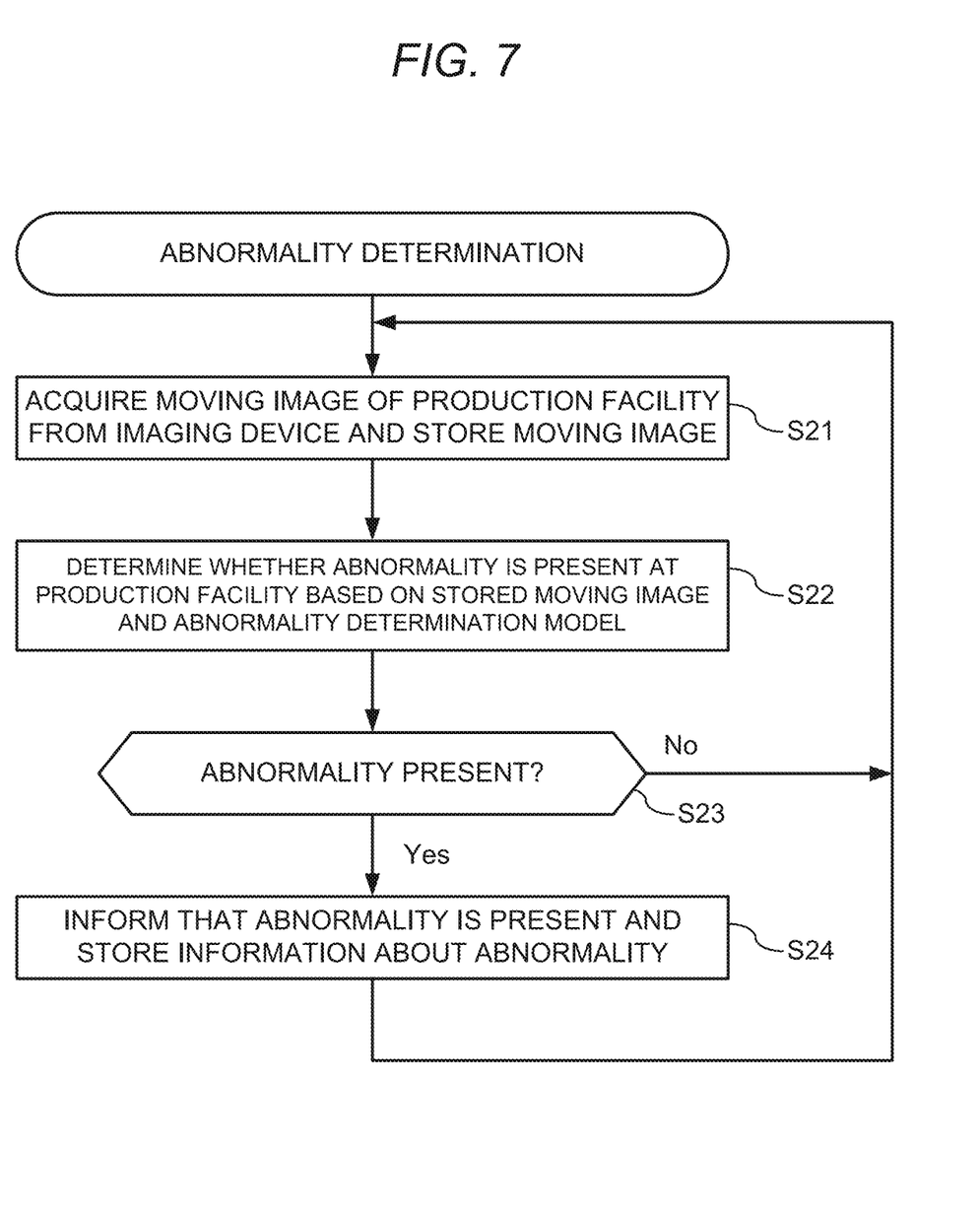
FIG. 7 is a flowchart of an abnormality determination operation performed by the abnormality determination device according to the embodiment of the present disclosure.

With reference to FIG. 7, an abnormality determination operation performed by the abnormality determination device 20 is described. In this example, the abnormality determination model is received from the model generation device 10 and stored in the storage 220 before the operation illustrated in FIG. 7 is started. The operations illustrated in FIG. 7 are performed, for example, at the start of the operation of the production facility 30 and are continuously performed during the operation of production facility 30.

The moving image acquirer 201 in the controller 200 in the abnormality determination device 20 acquires the moving images of the production facility 30 captured with the imaging device 40 from the imaging device 40 and stores the moving images into the storage 220 (step S21).

The abnormality determiner 203 in the controller 200 determines whether an abnormality is present at the production facility 30 based on the moving images stored in the storage 220 and the abnormality determination model stored in the storage 220 (step S22).

When the abnormality determiner 203 determines that an abnormality is not present (No in step S23), the controller 200 repeats the operations in step S21 and subsequent steps.

When the abnormality determiner 203 determines that an abnormality is present (Yes in step S23), the abnormality informer 204 in the controller 200 controls the display 230 to inform the user that an abnormality is present and stores information about the abnormality into the storage 220 (step S24). The controller 200 then repeats the operations in step S21 and subsequent steps.

The abnormality determination system 1 according to the embodiment has been described above. The model generation device 10 in the abnormality determination system 1 specifies each partial moving image for the corresponding operation mode in the moving images acquired by imaging the production facility 30 that operates in multiple operation modes and generates the abnormality determination model based on the time series relationship between the partial moving images for each operation mode. The abnormality determination device 20 in the abnormality determination system 1 determines whether an abnormality is present at the production facility 30 based on the moving images acquired by imaging the production facility 30 and the abnormality determination model generated by the model generation device 10. Thus, the abnormality determination system 1 allows the abnormality of the production facility 30 to be determined, for example, when an abnormality is present in the order of switching of the operation mode. In other words, the abnormality determination system 1 can determine the abnormality of the production facility 30 when a time-series abnormality associated with the operating mode is present. Thus, the abnormality determination system 1 allows the abnormality of the production facility 30 that operates in multiple operating modes to be determined appropriately.

Modifications

In the embodiment, the model generation device 10 and the abnormality determination device 20 are separate devices. In some embodiments, these devices may be integrated as a single abnormality determination device. In this case, the integrated abnormality determination device is an example of an abnormality determination system according to an aspect of the present disclosure.

In the embodiment, the abnormality determination device 20 transmits the moving images used in the model generation to the model generation device 10. However, a device different from the abnormality determination device 20 may acquire the moving images from the imaging device 40 and transmit the moving images to the model generation device 10.

In the hardware configuration illustrated in FIG. 5, the model generation device 10 and the abnormality determination device 20 each include the secondary storage device 1004. However, the hardware configuration is not limited to this. The secondary storage device 1004 may be external to the model generation device 10 and the abnormality determination device 20, and the model generation device 10 and the abnormality determination device 20 may be connected to the secondary storage device 1004 through the interface 1003. In this embodiment, removable media, such as a USB flash drive or a memory card may also be used as the secondary storage device 1004.

Instead of the hardware configuration illustrated in FIG. 5, a dedicated circuit using a component, such as an application-specific integrated circuit (ASIC) or a field-programmable gate array (FPGA) may be used to form the model generation device 10 and the abnormality determination device 20. In the hardware configuration illustrated in FIG. 5, some of the functions of the model generation device 10 and the abnormality determination device 20 may be implemented by, for example, a dedicated circuit connected to the interface 1003.

The programs used by the model generation device 10 and the abnormality determination device 20 may be stored in a non-transitory computer-readable recording medium, such as compact disc read-only memory (CD-ROM), a digital versatile disc (DVD), a USB flash drive, a memory card, and an HDD, and may then be distributed. Such programs may be installed on a specific or general-purpose computer, and the computer may then function as the model generation device 10 and the abnormality determination device 20.

The programs described above may be stored in a storage device in another server on the Internet and may then be downloaded from the server.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Abnormality determination system
10 Model generation device
20 Abnormality determination device
30 Production facility
40 Imaging device
100 Controller
101 Moving image acquirer
102 Setter
103 Specifier
104 Model generator
105 Model transmitter
110 Communicator
120 Storage
130 User interface
200 Controller
201 Moving image acquirer
202 Model acquirer
203 Abnormality determiner
204 Abnormality informer
205 Moving image transmitter
210 First communicator
211 Second communicator
220 Storage
230 Display
1000 Bus
1001 Processor
1002 Memory
1003 Interface
1004 Secondary storage device
NT Network

The invention claimed is:

1. A model generation device, comprising:
a specifier to specify partial moving images included in a moving image acquired by imaging a production facility that is operable in a plurality of operation modes and performs a periodic operation in each operation mode, the partial moving images being images for the respective operation modes, each partial moving image being specified based on a point in time at which the corresponding operation mode changes is specified; and
a model generator to generate, based on a time-series relationship between the partial moving images specified by the specifier for the respective operation modes, an abnormality determination model for determination of whether an abnormality is present at the production facility based on the moving image acquired by imaging the production facility.

2. An abnormality determination device, comprising:
a storage to store the abnormality determination model generated by the model generation device according to claim 1;
a moving image acquirer to acquire a moving image that is acquired by an imager imaging the production facility; and
an abnormality determiner to determine whether an abnormality is present at the production facility based on the moving image acquired by the moving image acquirer and the abnormality determination model stored in the storage.

3. An abnormality determination system, comprising:
the model generation device according to claim 1; and
an abnormality determination device comprising
a storage to store the abnormality determination model generated by the model generation device,
a moving image acquirer to acquire a moving image that is acquired by an imager imaging the production facility, and
an abnormality determiner to determine whether an abnormality is present at the production facility based on the moving image acquired by the moving image acquirer and the abnormality determination model stored in the storage.

4. A model generation method, comprising:
specifying partial moving images included in a moving image acquired by imaging a production facility that is operable in a plurality of operation modes and performs a periodic operation in each operation mode, the partial moving images being images for the respective operation modes, each partial moving image being specified based on a point in time at which the corresponding operation mode changes is specified; and
generating, based on a time-series relationship between the specified partial moving images for the respective operation modes, an abnormality determination model for determination of whether an abnormality is present at the production facility based on the moving image acquired by imaging the production facility.

5. A non-transitory computer-readable recording medium storing a program, the program causing a computer to function as:
a specifier to specify partial moving images included in a moving image acquired by imaging a production facility that is operable in a plurality of operation modes and performs a periodic operation in each operation mode, the partial moving images being images for the respective operation modes, each partial moving image being specified based on a point in time at which the corresponding operation mode changes is specified; and
a model generator to generate, based on a time-series relationship between the partial moving images specified by the specifier for the respective operation modes, an abnormality determination model for determination of whether an abnormality is present at the production facility based on the moving image acquired by imaging the production facility.

* * * * *